(12) United States Patent
Liu

(10) Patent No.: US 11,702,184 B2
(45) Date of Patent: Jul. 18, 2023

(54) MANEUVERABLE AIRSHIP WITH GASBAG AND COCKPIT ARRANGED ALONG SHAFT BODY

(71) Applicant: Huan-Chang Liu, Taipei (TW)

(72) Inventor: Huan-Chang Liu, Taipei (TW)

( * ) Notice: Subject to any disclaimer, the term of this patent is extended or adjusted under 35 U.S.C. 154(b) by 7 days.

(21) Appl. No.: 17/530,394

(22) Filed: Nov. 18, 2021

(65) Prior Publication Data

US 2022/0388623 A1 Dec. 8, 2022

(30) Foreign Application Priority Data

Jun. 8, 2021 (CN) .......................... 202110638580.7

(51) Int. Cl.
- *B64B 1/58* (2006.01)
- *B64B 1/30* (2006.01)
- *B64B 1/22* (2006.01)
- *B64B 1/66* (2006.01)

(52) U.S. Cl.
CPC ............... *B64B 1/58* (2013.01); *B64B 1/22* (2013.01); *B64B 1/30* (2013.01)

(58) Field of Classification Search
CPC ............... B64B 1/22; B64B 1/30; B64B 1/58
See application file for complete search history.

(56) References Cited

FOREIGN PATENT DOCUMENTS

| CN | 105836096 B | * | 1/2018 | ............... B64B 1/58 |
|----|-------------|---|--------|--------------------------|
| CN | 110015396 A | * | 7/2019 | ............... B64B 1/08 |
| CN | 113086154 A | * | 7/2021 | ............... B64B 1/22 |
| WO | WO-0032469 A1 | * | 6/2000 | ............... B64B 1/06 |
| WO | WO-0172588 A1 | * | 10/2001 | ............... B64B 1/26 |
| WO | WO-2005032939 A1 | * | 4/2005 | ............ B64C 27/20 |
| WO | WO-2006078617 A1 | * | 7/2006 | ............... B64B 1/14 |

OTHER PUBLICATIONS

Machine Translation of CN-105836096-B, Chen J, Jan. 2018 (Year: 2018).*
Machine Translation of CN-113086154-A, Chen L, Jul. 2021 (Year: 2021).*
Machine Translation of WO-0172588-A1, Grimm F, Oct. 2001 (Year: 2001).*
Machine Translation of WO-2005032939-A1, Autherith F, Apr. 2005 (Year: 2005).*
Machine Translation of CN-110015396-A, Chen W, Jul. 2019 (Year: 2019).*

* cited by examiner

*Primary Examiner* — Tien Q Dinh
*Assistant Examiner* — Katherine June Bolek
(74) *Attorney, Agent, or Firm* — Bayramoglu Law Offices LLC

(57) ABSTRACT

An airship includes a gasbag, a cockpit and a first shaft body, where the gasbag is filled with a gas for lifting the airship; the gasbag and the cockpit are sequentially arranged along an axial direction of the first shaft body and fixed to the first shaft body, and there is a spacing between the gasbag and the cockpit; at least one of the gasbag and the cockpit is rotatably connected to the first shaft body; after the gasbag is filled with the gas for lifting the airship, any section of the gasbag in a direction perpendicular to the axial direction of the first shaft body is circular or annular; and the axial direction of the first shaft body is the same as a direction of gravity.

12 Claims, 9 Drawing Sheets

MANEUVERABLE AIRSHIP WITH GASBAG AND COCKPIT ARRANGED ALONG SHAFT BODY

CROSS REFERENCE TO THE RELATED APPLICATIONS

This application is based upon and claims priority to Chinese Patent Application No. 202110638580.7, filed on Jun. 8, 2021, the entire contents of which are incorporated herein by reference.

TECHNICAL FIELD

The present application relates to the technical field of aviation devices, and in particular to an airship.

BACKGROUND

At present, an airship gains buoyancy from a gas that is less dense than air and is filled in a gasbag, so as to navigate through the air.

It is found that after the gasbag is filled with the gas for lifting the airship, the gasbag is mostly shaped like a sphere or a thick cylinder. In addition, the airship is usually provided with a tail fin for steering. When the airship needs to change the heading, in order to prevent the operating angle of the operator in the cockpit from being restricted, the gasbag and the cockpit need to revolve around a point outside the airship. However, this results in low maneuverability and stability of the airship.

Therefore, there is an urgent need for an airship with high maneuverability and stability.

SUMMARY

An objective of the present application is to provide an airship with high maneuverability.

In order to solve the above problem, an embodiment of the present application provides an airship. The airship includes a gasbag, a cockpit and a first shaft body, where the gasbag is filled with a gas for lifting the airship; the gasbag and the cockpit are sequentially arranged along an axial direction of the first shaft body and fixed to the first shaft body, and there is a spacing between the gasbag and the cockpit; at least one of the gasbag and the cockpit is rotatably connected to the first shaft body; after the gasbag is filled with the gas for lifting the airship, any section of the gasbag in a direction perpendicular to the axial direction of the first shaft body is circular or annular; and the axial direction of the first shaft body is the same as a direction of gravity.

In the airship provided by the embodiment of the present application, the gasbag and the cockpit are sequentially arranged along the axial direction of the first shaft body and fixed to the first shaft body, and there is a spacing between the gasbag and the cockpit. At least one of the gasbag and the cockpit is rotatably connected to the first shaft body. When the airship needs to turn after the gasbag is filled with the gas for lifting the airship, only the cockpit needs to be rotated relative to the gasbag. This prevents an operating angle of an operator in the cockpit from being restricted, and avoids the need to rotate the gasbag at the same time when the airship needs to turn, thereby improving the controllability, maneuverability and stability of the airship during operation.

In addition, the airship may further include a fixing portion; and the fixing portion may be used for pulling the gasbag, supporting the gasbag, or restricting the gasbag to expand in the direction of gravity after the gasbag is filled with the gas for lifting the airship, such that a maximum dimension of the gasbag in the direction perpendicular to the direction of gravity is greater than that of the gasbag in the direction of gravity. The fixing portion pulls the gasbag, supports the gasbag, or restricts the gasbag from expanding in the direction of gravity after the gasbag is filled with the gas for lifting the airship. Thus, the maximum dimension of the gasbag in the direction perpendicular to the direction of gravity is greater than that of the gasbag in the direction of gravity, thereby reducing the maximum dimension of the gasbag in the direction of gravity. In this way, in case the airship encounters a crosswind during flight or landing, when the crosswind blows to the gasbag, a wind force generated by the crosswind on the gasbag is decomposed into a first force component tangent to a surface of the gasbag and a second force component perpendicular to the first force component. In this embodiment, the maximum dimension of the gasbag in the direction of gravity is less than that of the gasbag in the direction perpendicular to the direction of gravity. Therefore, compared to a gasbag (spherical) in the related art, the gasbag in this embodiment reduces the second component force generated by the crosswind on the gasbag, thereby reducing the influence of the crosswind on the gasbag and preventing the airship from greatly deviating.

In addition, after the gasbag is filled with the gas for lifting the airship, the maximum dimension of the gasbag in the direction perpendicular to the direction of gravity may be defined as a first dimension, and the maximum dimension of the gasbag in the direction of gravity may be defined as a second dimension; and the first dimension may be 3-9 times the second dimension.

In addition, the fixing portion may be a first rigid ring; an inner ring surface or an outer ring surface of the first rigid ring may be fixed to the gasbag; the first rigid ring may pull or support the gasbag after the gasbag is filled with the gas for lifting the airship, such that the maximum dimension of the gasbag in the direction perpendicular to the direction of gravity may be greater than that of the gasbag in the direction of gravity.

In addition, the airship may further include a ring fin surrounding the gasbag; and the first rigid ring may be fixed to the ring fin and pull the gasbag through the ring fin. Specifically, the ring fin is fixed to the first rigid ring, and the ring fin is also fixed to the gasbag. After the gasbag is filled with the gas for lifting the airship, a part of the ring fin between the first rigid ring and the gasbag is in a flattened state. During the flight of the airship, the ring fin increases a contact area between the airship and the air, which increases air resistance to the airship, thereby avoiding the airship from bumping and improving the stability of the airship during flight.

In addition, the airship may further include two second rigid rings and multiple connecting portions; the two second rigid rings may be arranged coaxially with the first rigid ring, and the two second rigid rings may be sequentially arranged along an axial direction of the first rigid ring; the first rigid ring may be located between the two second rigid rings; and the multiple connecting portions may be distributed along a circumferential direction of the first rigid ring, and each of the connecting portions may be connected to the first rigid ring and the two second rigid rings. In this way, when the first rigid ring receives a force, the first rigid ring can transmit the force to the two second rigid rings via the multiple connecting portions so as to reduce the force received by the first rigid ring, thereby preventing the first rigid ring from being deformed by the force.

In addition, the gasbag may include a top portion, a connecting portion and a bottom portion that are sequentially arranged along the axial direction of the first shaft body; the top portion and the bottom portion may be arranged opposite to each other; the connecting portion may be connected to the top portion and the bottom portion; the top portion, the connecting portion and the bottom portion may jointly enclose the gasbag; the first rigid ring may be fixed to the connecting portion; a maximum dimension of the connecting portion in the direction perpendicular to the axial direction of the first rigid ring may be greater than that of either the top portion or the bottom portion in the direction perpendicular to the axial direction of the first rigid ring; and a surface area of the top portion may be 1-1.3 times that of the bottom portion.

In addition, the airship may further include a second shaft body, a first power device and a second power device; the second shaft body may be coaxially provided with the first shaft body; the second shaft body and the first power device may be located on a side of the gasbag away from the cockpit; the first power device may be fixed to the second shaft body; the second power device may be located between the gasbag and the cockpit and is fixed to the first shaft body; the first power device and the second power device may be used to drive the airship to move in the direction perpendicular to the axial direction of the first shaft body; and alternatively, the first power device and the second power device may be used to drive the airship to move along the axial direction of the first shaft body; and the cockpit may be used to control the first power device and the second power device to rotate along the circumferential direction of the first shaft body. When the first power device and the second power device drive the airship to move in the direction perpendicular to the axial direction of the first shaft body, a resultant force generated by the first power device and the second power device is located at a center of gravity of the airship. In this way, the stability of the airship during operation is improved.

In addition, the first power device and the second power device may respectively include a third shaft body, blades and rotating portions; the blades may be respectively rotatably fixed to one end of the third shaft body through the rotating portions; and the third shaft body of the first power device may be fixed to the second shaft body, and the third shaft body of the second power device may be fixed to the first shaft body.

In addition, the first power device and the second shaft body may be rigidly connected; the second power device and the cockpit may be rigidly connected to the first shaft body; and the gasbag is fixed to the first shaft body and may be rotatable along the circumferential direction of the first shaft body.

In addition, the airship may further include a function cabin; the gasbag and the function cabin are fixed on the first shaft body and may be rotatable along the circumferential direction of the first shaft body; and the cockpit may be rigidly connected to the first shaft body. When the airship needs to turn, only the cockpit is rotated, which prevents the operating angle of the operator in the cockpit from being restricted. It is not necessary to rotate the gasbag and the function cabin at the same time when the cockpit is rotated, thereby improving the controllability, maneuverability and stability of the airship during operation.

In addition, the function cabin may be located between the gasbag and the cockpit, and there may be a spacing between the function cabin and the gasbag as well as the cockpit.

In addition, the function cabin may include an upper portion and a lower portion that may be provided opposite to the upper portion and connected to the upper portion; and the upper portion and the lower portion may be sequentially arranged along the axial direction of the first shaft body, and a surface area of the upper portion may be 1-1.3 times that of the lower portion.

DETAILED DESCRIPTION OF THE
EMBODIMENTS

An embodiment of the present application provides an airship. The airship includes a gasbag, a cockpit and a first shaft body. The gasbag is filled with a gas for lifting the airship. The gasbag and the cockpit are sequentially arranged along an axial direction of the first shaft body and fixed to the first shaft body, and there is a spacing between the gasbag and the cockpit. At least one of the gasbag and the cockpit is rotatably connected to the first shaft body. When the airship needs to turn after the gasbag is filled with the gas for lifting the airship, only the cockpit needs to be rotated relative to the gasbag. This prevents an operating angle of an operator in the cockpit from being restricted, and avoids the need to rotate the gasbag at the same time when the airship needs to turn, thereby improving the controllability, maneuverability and stability of the airship during operation.

In order to make the objectives, technical solutions and advantages of the embodiments of the present application clearer, the implementations of the present application are described in detail below with reference to the drawings. Those of ordinary skill in the art should understand that many technical details are proposed in the implementations of the present application to help the present application to be better understood. However, the technical solutions claimed in the present application can still be realized based on various changes and modifications made to the following implementations.

Figure 1:
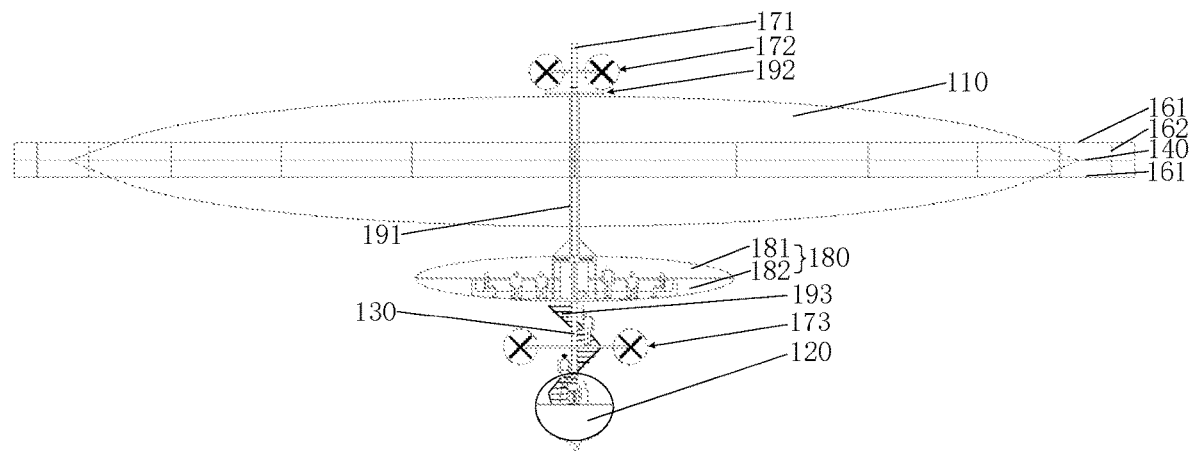
FIG. 1 is a view illustrating a structure of an airship according to an embodiment of the present application.

An embodiment of the present application provides an airship. Referring to FIG. 1, the airship includes a gasbag 110, a cockpit 120 and a first shaft body 130. The gasbag 110 is filled with a gas for lifting the airship. The gasbag 110 and the cockpit 120 are sequentially arranged along an axial direction of the first shaft body 130 and fixed to the first shaft body 130, and there is a spacing between the gasbag 110 and the cockpit 120. At least one of the gasbag 110 and the cockpit 120 is rotatably connected to the first shaft body 130. After the gasbag 110 is filled with the gas for lifting the airship, any section of the gasbag 110 in a direction perpendicular to the axial direction of the first shaft body 130 is circular or annular. The axial direction of the first shaft body 130 is the same as a direction of gravity.

Specifically, the gasbag 110 is made of a flexible and airtight material. In this embodiment, the gasbag 110 is made of reinforced nylon. In an example, the gasbag is made of polyester. In addition, the cockpit 120 is used to carry an operator. In this embodiment, a shell of the cockpit 120 is made of aluminum alloy. In an example, the shell of the cockpit is made of alloy steel. In another example, in order to reduce the weight of the airship, the shell of the cockpit is made of carbon fiber. In addition, the first shaft body 130 is made of a rigid material. In this embodiment, the first shaft body 130 is made of aluminum alloy. In an example, the first shaft body is made of alloy steel. In another example, in order to reduce the weight of the airship, the first shaft body is made of carbon fiber.

More specifically, in this embodiment, the cockpit 120 is rigidly connected to the first shaft body 130, and the gasbag 110 is rotatably connected to the first shaft body 130. When the airship needs to turn, it is only necessary to rotate the cockpit 120 and the first shaft body 130 at the same time, and the gasbag 110 remains stationary. In an example, the cockpit is rotatably connected to the first shaft body, and the gasbag is rigidly connected to the first shaft body. When the airship needs to turn, only the cockpit needs to be rotated, and the gasbag and the first shaft body remain stationary. In another example, the cockpit and the gasbag are rotatably fixed on the first shaft body. When the airship needs to turn, only the cockpit can be rotated, or the cockpit and the first shaft body can be rotated at the same time, and the gasbag remains stationary.

Figure 2:
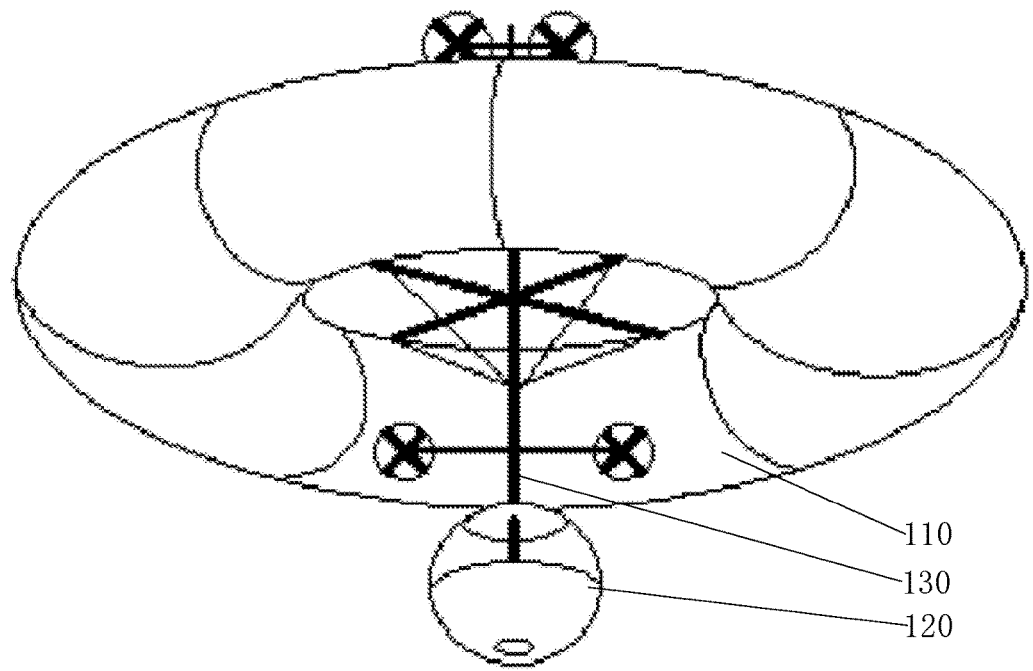
FIG. 2 is a view illustrating a structure of a gasbag of the airship in an example according to an embodiment of the present application.

Further, in this embodiment, after the gasbag 110 is filled with the gas for lifting the airship, any section of the gasbag 110 perpendicular to the axial direction of the first shaft body 130 is circular. In an example, referring to FIG. 2, after the gasbag 110 is filled with the gas for lifting the airship, any section of the gasbag 110 perpendicular to the axial direction of the first shaft body 130 is annular.

Further, referring to FIG. 1, the airship includes a fixing portion 140. The fixing portion 140 is used for pulling the gasbag 110, supporting the gasbag 110, or restricting the gasbag 110 from expanding in the direction of gravity after the gasbag 110 is filled with the gas for lifting the airship, such that a maximum dimension of the gasbag 110 in the direction perpendicular to the direction of gravity is greater than that of the gasbag 110 in the direction of gravity.

Figure 3:
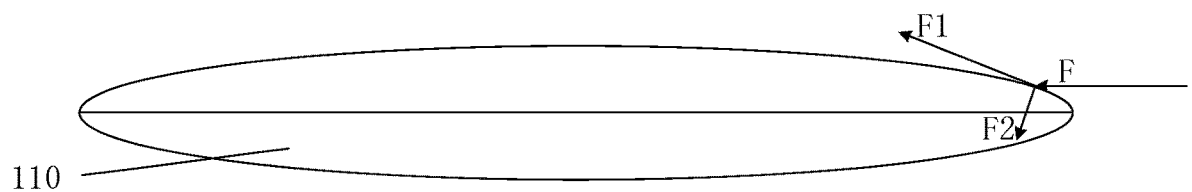
FIG. 3 illustrates an analysis of a force received by the gasbag in case of a crosswind according to an embodiment of the present application.

In this way, referring to FIG. 3, in case the airship encounters a crosswind during flight or landing, when the crosswind blows to the gasbag 110, a wind force F generated by the crosswind on the gasbag 110 is decomposed into a first force component F1 tangent to a surface of the gasbag 110 and a second force component F2 perpendicular to the first force component F1. In this embodiment, the maximum dimension of the gasbag 110 in the direction of gravity is less than that of the gasbag 110 in the direction perpendicular to the direction of gravity. Therefore, compared to a gasbag (spherical) in the related art, the gasbag 110 in this embodiment reduces the second component force F2 generated by the crosswind on the gasbag 110, thereby reducing the influence of the crosswind on the gasbag 110 and preventing the airship from greatly deviating.

Figure 4:
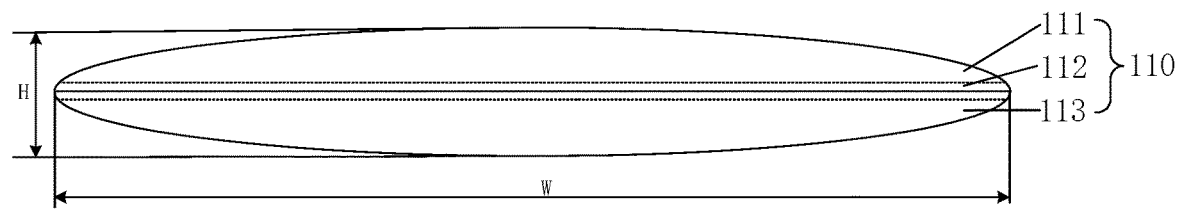
FIG. 4 is a view illustrating a structure of the gasbag according to an embodiment of the present application.

Referring to FIGS. 1 and 4, after the gasbag 110 is filled with the gas for lifting the airship, a maximum dimension of the gasbag 110 in a direction perpendicular to the axial direction of the first shaft body 130 is defined as a first dimension W, and a maximum dimension of the gasbag 110 in the axial direction of the first shaft body 130 is defined as a second dimension. That is, during the flight of the airship, the maximum dimension of the gasbag 110 in the direction perpendicular to the direction of gravity is the first dimension W, and the maximum dimension of the gasbag 110 in the direction of gravity is the second dimension H.

Further, the first dimension W is 4-9 times the second dimension H. In this way, during the flight of the airship, the maximum dimension of the gasbag 110 in the direction of gravity is further reduced. When the airship encounters a crosswind during flight, the influence of the crosswind on the gasbag 110 is further reduced, thereby further avoiding a large deviation of the airship.

Preferably, the first dimension W is 5-7 times the second dimension H. In this embodiment, the first dimension W is 6 times the second dimension H.

Further, in this embodiment, the fixing portion 140 is a first rigid ring. An inner ring surface or an outer ring surface of the first rigid ring (i.e. the fixing portion 140) is fixed to the gasbag 110. The first rigid ring pulls or supports the gasbag after the gasbag 110 is filled with the gas for lifting the airship, such that the maximum dimension of the gasbag 110 in the direction perpendicular to the direction of gravity is greater than that of the gasbag 110 in the direction of gravity.

Specifically, the first rigid ring is made of a rigid material. In this embodiment, the first rigid ring is made of aluminum alloy. In an example, the first rigid ring is made of alloy steel. In another example, in order to reduce the weight of the airship, the first rigid ring is made of carbon fiber.

It should be noted that in other modifiable embodiments, the fixing portion may not be the first rigid ring. The fixing portion may be any device that can be used for pulling the gasbag, supporting the gasbag, or restricting the gasbag from expanding in the direction of gravity after the gasbag is filled with the gas for lifting the airship, such that the maximum dimension of the gasbag in the direction perpendicular to the direction of gravity is greater than that of the gasbag in the direction of gravity.

Figure 5:
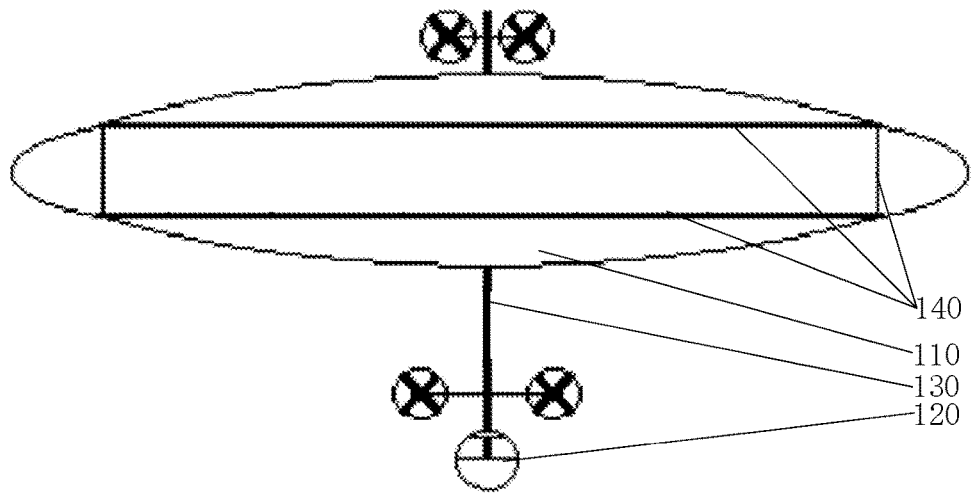
FIG. 5 is a view illustrating a structure of a fixing portion of the airship in an example according to an embodiment of the present application.

In an example, referring to FIG. 5, the fixing portion 140 includes multiple ropes. Two ends of each of the ropes of the fixing portion 140 are respectively fixed to an inner wall surface of the gasbag 110. The multiple ropes pull the gasbag 110 after the gasbag 110 is filled with the gas for lifting the airship, such that the maximum dimension of the gasbag 110 in the direction perpendicular to the direction of gravity is greater than that of the gasbag 110 in the direction of gravity.

In another example, the fixing portion is a frame, and the gasbag is located in the frame. The frame restricts the gasbag from expanding in the direction of gravity after the gasbag is filled with the gas for lifting the airship, such that the maximum dimension of the gasbag in the direction perpendicular to the direction of gravity is greater than that of the gasbag in the direction of gravity.

Figure 6:
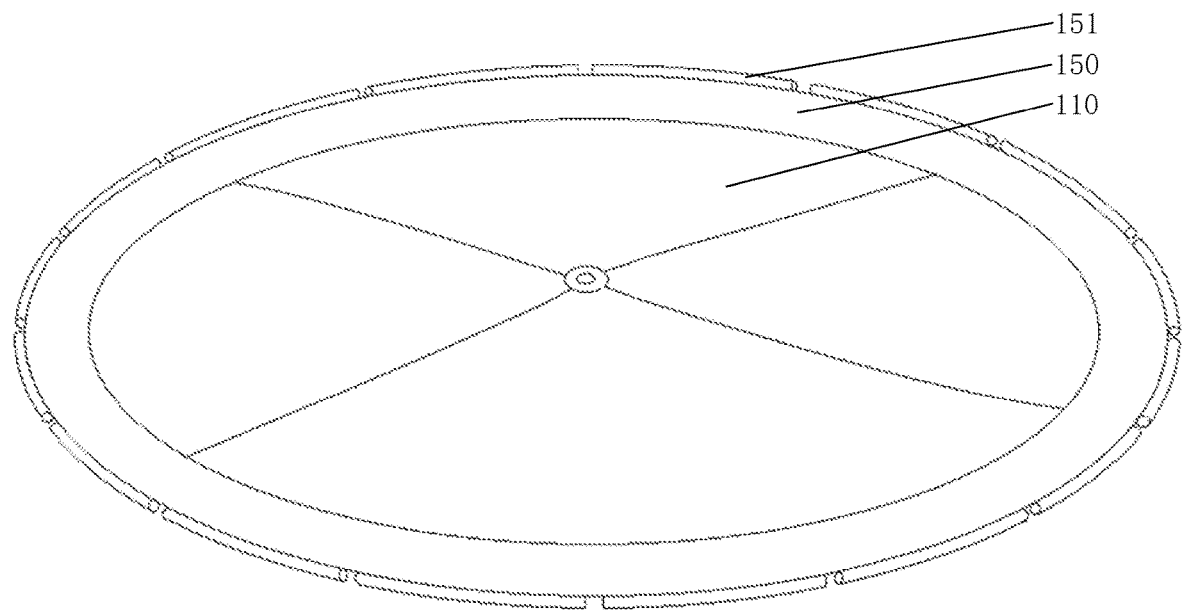
FIG. 6 is a view illustrating a structure of a ring fin and the gasbag unfilled according to an embodiment of the present application.
Figure 7:
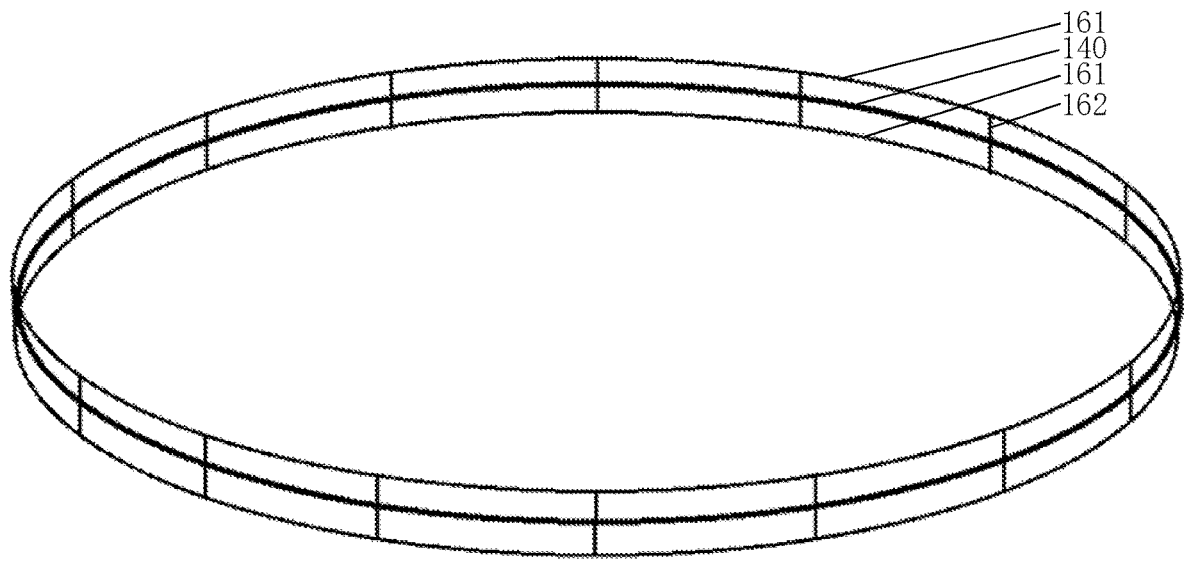
FIG. 7 is a view illustrating a structure of the fixing portion, a second rigid ring and multiple connecting portions according to an embodiment of the present application.
Figure 8:
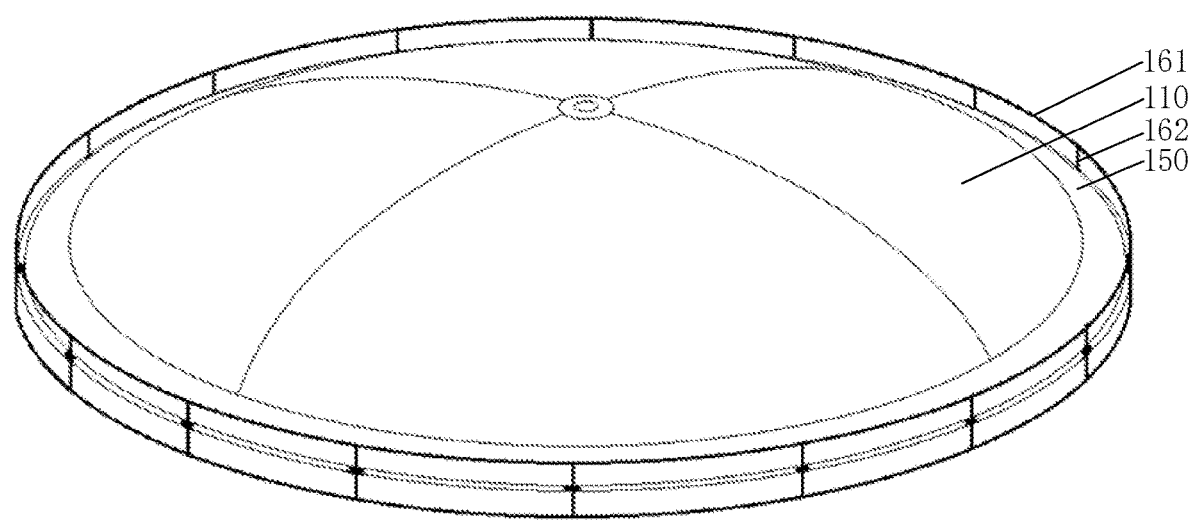
FIG. 8 is a view illustrating a structure of the ring fin, the second rigid ring, the multiple connecting portions and the gasbag unfilled according to an embodiment of the present application.

In an embodiment, referring to FIGS. 6 to 8, the airship further includes a ring fin 150 surrounding the gasbag. The first rigid ring is fixed to the ring fin 150 and pulls the gasbag 110 through the ring fin 150.

Specifically, the ring fin 150 is fixed to the first rigid ring, and the ring fin 150 is also fixed to the gasbag 110. After the gasbag 110 is filled with the gas for lifting the airship, a part of the ring fin 150 between the first rigid ring and the gasbag 110 is in a flattened state. During the flight of the airship, the ring fin 150 increases a contact area between the airship and the air, which increases air resistance to the airship, thereby avoiding the airship from bumping.

In this embodiment, an inner edge of the ring fin 150 is fixed to an outer edge of the gasbag 110. An outer edge of the ring fin 150 is provided with a wrapping portion 151 for wrapping the first rigid ring. The wrapping portion 151 wraps the first rigid ring, such that the first rigid ring is fixed to the ring fin 150 and pulls the gasbag 110 through the ring fin 150. In this way, after the gasbag 110 is filled with the gas for lifting the airship, the maximum dimension of the gasbag 110 in a direction perpendicular to an axial direction of the first rigid ring (that is, the axial direction of the first shaft body 130) is greater than that of the gasbag 110 in the axial direction of the first rigid ring, and the entire ring fin 150 is in a flattened state. In an example, the ring fin is a hollow structure. The first rigid ring is located inside the ring fin, such that the first rigid ring supports the ring fin from the inside of the ring fin and pulls the gasbag through the ring fin. In this way, after the gasbag is filled with the gas for lifting the airship, the maximum dimension of the gasbag in the direction perpendicular to the axial direction of the first rigid ring is greater than that of the gasbag in the axial direction of the first rigid ring, and the entire ring fin is also in a flattened state.

In addition, it should be noted that in other modifiable embodiments, only the first rigid ring and the gasbag may be provided. The first rigid ring directly pulls or supports the gasbag, such that the maximum dimension of the gasbag in the direction perpendicular to the axial direction of the first rigid ring is greater than that of the gasbag in the axial direction of the first rigid ring. In an example, the first rigid ring is located inside the gasbag, and the outer ring surface of the first rigid ring is attached and fixed to the inner wall surface of the gasbag, such that the first rigid ring supports the gasbag from the inside of the gasbag. In another example, the first rigid ring is located outside the gasbag, and the inner ring surface of the first rigid ring is fixed to the outer wall surface of the gasbag, such that the first rigid ring pulls the gasbag from the outside of the gasbag.

In addition, the ring fin 150 is made of a flexible material. In this embodiment, the ring fin 150 is made of reinforced nylon. In an example, the ring fin is made of polyester.

In addition, referring to FIGS. 1, 7 and 8, the airship further includes two second rigid rings 161 and multiple connecting portions 162. The two second rigid rings 161 are arranged coaxially with the first rigid ring, and the two second rigid rings 161 are sequentially arranged along the axial direction of the first rigid ring. The first rigid ring is located between the two second rigid rings 161. The multiple connecting portions 162 are distributed along a circumferential direction of the first rigid ring, and each of the connecting portions 162 is connected to the first rigid ring and the two second rigid rings 161. In this way, when the first rigid ring receives a force, the first rigid ring can transmit the force to the two second rigid rings 161 via the multiple connecting portions 162 to reduce the force received by the first rigid ring, thereby preventing the first rigid ring from being deformed by the force.

It should be noted that in other modifiable embodiments, the airship may further include other structure. When the first rigid ring receives a force, the first rigid ring can transmit the force to other structure, thereby preventing the first rigid ring from being deformed by the force. In an example, the airship includes multiple connecting posts and multiple ropes. The multiple connecting posts are distributed along the circumferential direction of the first rigid ring, and a part between two ends of each of the connecting posts is fixed to the first rigid ring. One end of each of two ropes is fixed at either end of any connecting post, and the other end of each of the two ropes is located on either side of the connecting post and fixed on the first rigid ring. The first rigid ring, the multiple connecting posts and the multiple ropes define a tension structure, such that when the first rigid ring receives a force, the first rigid ring can transmit the force to the ropes and the connecting posts, thereby preventing the first rigid ring from being deformed by the force.

In an embodiment, referring to FIGS. 4 and 8, the gasbag 110 includes a top portion 111, a connecting portion 112 and a bottom portion 113 that are sequentially arranged along the axial direction of the first shaft body 130. The top portion 111 and the bottom portion 113 are arranged opposite to each other. The connecting portion 112 is connected to the top portion 111 and the bottom portion 113. The top portion, the connecting portion and the bottom portion jointly enclose the gasbag 110. The first rigid ring is fixed to the connecting portion 112. A maximum dimension of the connecting portion 112 in the direction perpendicular to the axial direction of the first rigid ring is greater than that of either the top portion 111 or the bottom portion 113 in the direction perpendicular to the axial direction of the first rigid ring. Specifically, in this embodiment, the first rigid ring is fixed to the connecting portion 112 through the ring fin 150.

Further, a surface area of the top portion 111 is 1-1.3 times that of the bottom portion 113.

In this embodiment, the surface area of the top portion 111 is the same as that of the bottom portion 113. When the airship encounters a crosswind during flight, a distance traveled by the crosswind to blow across the top portion 111 is the same as that traveled by the crosswind to blow across the bottom portion 113. Therefore, a flow velocity of the crosswind to blow across the top portion 111 is the same as that of the crosswind to blow across the bottom portion 113, such that air pressure on an outer surface of the top portion 111 is the same as that on an outer surface of the bottom portion 113. In this way, the maneuverability and stability of the airship during operation are further improved.

In addition, it should be noted that in this embodiment, there is a spacing between the gasbag 110 and the cockpit 120. When the airship encounters a crosswind during flight, the crosswind can blow across a surface of the bottom portion 113 through the spacing between the gasbag 110 and the cockpit 120. The distance traveled by the crosswind to blow across the top portion 111 is still the same as that traveled by the crosswind to blow across the bottom portion 113.

It should be noted that, in other modifiable embodiments, the surface area of the top portion may also be greater than that of the bottom portion and not more than 1.3 times that of the bottom portion. When the airship encounters a crosswind during flight, the distance traveled by the crosswind to blow across the top portion is slightly greater than that traveled by the crosswind to blow across the bottom portion. Therefore, the flow velocity of the crosswind to blow across the top portion is slightly greater than that of the crosswind to blow across the bottom portion, such that the air pressure on the outer surface of the top portion is slightly less than that on the outer surface of the bottom portion, thereby providing power for the airship to ascend. In an example, the surface area of the top portion is 1.3 times that of the bottom portion. In another example, a surface area of the top portion is 1.1 times that of the bottom portion.

In addition, referring to FIG. 1, the airship may further include a second shaft body 171, a first power device 172 and a second power device 173. The second shaft body 171 is coaxially provided with the first shaft body 130. The second shaft body 171 and the first power device 172 are located on a side of the gasbag 110 away from the cockpit 120. The first power device 172 is fixed to the second shaft body 171. The second power device 173 is located between the gasbag 110 and the cockpit 120 and is fixed to the first shaft body 130. The first power device 172 and the second power device 173 are used to drive the airship to move in the direction perpendicular to the axial direction of the first shaft body 130. Alternatively, the first power device 172 and the second power device 173 are used to drive the airship to move along the axial direction of the first shaft body 130. The cockpit 120 is used to control the first power device 172 and the second power device 173 to rotate along the circumferential direction of the first shaft body 130.

When the first power device 172 and the second power device 173 drive the airship to move in the direction perpendicular to the axial direction of the first shaft body 130, a resultant force generated by the first power device 172 and the second power device 173 is located at a center of gravity of the airship. In this way, the stability of the airship during operation is improved.

In this embodiment, the first shaft body 130 penetrates the gasbag 110 and is connected to the second shaft body 171. In an example, the first shaft body is located on a side of the gasbag close to the cockpit and is fixed to the gasbag. In this case, the first shaft body is not connected to the second shaft body.

Figure 9:
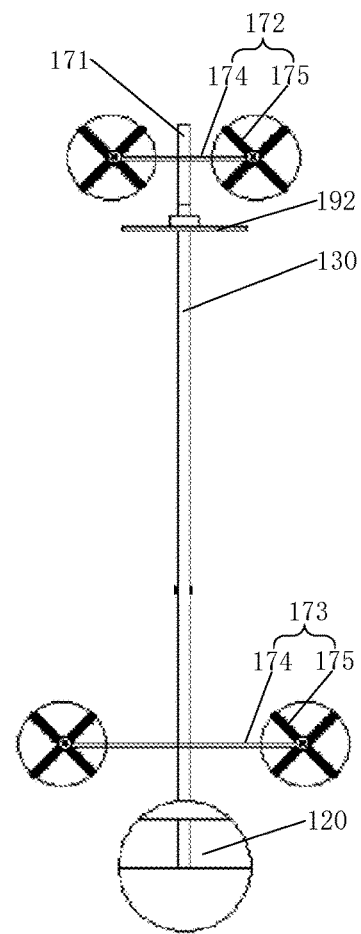
FIG. 9 is a view illustrating a structure of a first power device, a baffle, a first shaft body, a second shaft body, a second power device and a cockpit according to an embodiment of the present application.
Figure 10:
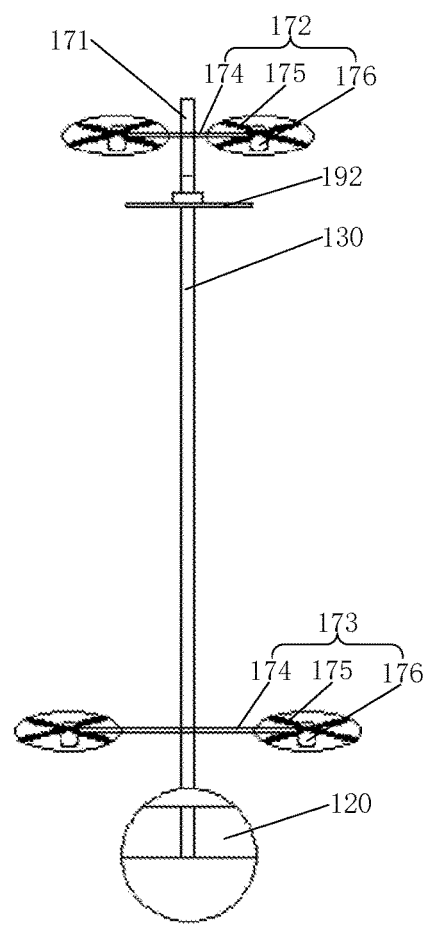
FIG. 10 is a view illustrating a structure of the first power device, the baffle, the first shaft body, the second shaft body, the second power device and the cockpit in another state according to an embodiment of the present application.

Referring to FIGS. 1, 9 and 10, in this embodiment, the first power device 172 and the second power device 173 respectively include a third shaft body 174, blades 175 and rotating portions 176. The blades 175 are respectively rotatably fixed to one end of the third shaft body 174 through the rotating portions 176. The third shaft body 174 of the first power device 172 is fixed to the second shaft body 171, and the third shaft body 174 of the second power device 173 is fixed to the first shaft body 130.

Specifically, when the airship needs to move in the direction perpendicular to the axial direction of the first shaft body 130, the blades 175 of the first power device 172 and the second power device 173 are rotated by the rotating portions 176 until blade surfaces of the blades 175 are parallel to the axial direction of the first shaft body 130. Thus, when the blades 175 are running, the airship is driven to move in the direction perpendicular to the axial direction of the first shaft body 130. In addition, the first power device 172 and the second power device 173 can be controlled to rotate along the circumferential direction of the first shaft body 130 through the cockpit 120. In this way, the first power device 172 and the second power device 173 provide power for the airship to move in any direction perpendicular to the axial direction of the first shaft body 130.

In addition, in this embodiment, when the airship needs to move along the axial direction of the first shaft body 130 and close to the ground, the blades 175 of the first power device 172 are rotated through the rotating portions 176 until the blade surfaces of the blades 175 are perpendicular to the axial direction of the first shaft body 130. Thus, when the blades 175 are running, the airship is driven to move along the axial direction of the first shaft body 130 and close to the ground. When the airship needs to move along the axial direction of the first shaft body 130 and away from the ground, the blades 175 of the second power device 173 are rotated through the rotating portions 176 until the blade surfaces of the blades 175 are perpendicular to the axial direction of the first shaft body 130. When the blades 175 are running, the airship is driven to move along the axial direction of the first shaft body 130 and away from the ground.

In addition, it should be noted that in other modifiable embodiments, the first power device and the second power device may also adopt other structures, which can be used to drive the airship to move in a direction perpendicular to the axial direction of the first shaft body, or to drive the airship to move in the axial direction of the first shaft body. In an example, the first power device and the second power device are electric motors, piston engines or turbine engines. When the airship needs to move in a direction, the electric motors, the piston engines or the turbine engines spray a gas in an opposite direction of the direction to push nearby air to move in the opposite direction of the direction. When the air receives a force provided by the electric motors, the piston engines or the turbine engines, it provides a reaction force to the electric motors, the piston engines or the turbine engines. In this way, the air pushes the electric motors, the piston engines or the turbine engines and even the airship to move in this direction.

In this embodiment, the first power device 172 and the second shaft body 171 are rigidly connected. The second power device 173 and the cockpit 120 are rigidly connected to the first shaft body 130. The gasbag 110 is rotatably fixed on the first shaft body 130 along the circumferential direction of the first shaft body 130. Since the second shaft body 171 is connected to the first shaft body 130, when the airship needs to move in any direction perpendicular to the axial direction of the first shaft body 130, the cockpit 120 can be rotated to prevent the operating angle of the operator in the cockpit 120 from being restricted. The first shaft body 130 can be rotated synchronously, and the first power device 172 and the second power device 173 can be rotated together via the first shaft body 130. This facilitates the first power device 172 and the second power device 173 to provide power for the airship to move in this direction.

In addition, it should be noted that, in an example, the first power device may be rotatably connected to the second shaft body, and the second power device and the cockpit may also be rotatably connected to the first shaft body. In this way, when the airship needs to move in any direction perpendicular to the axial direction of the first shaft body, the cockpit is rotated relative to the first shaft body to prevent the operating angle of the operator in the cockpit from being restricted. The first power device and the second power device are controlled to rotate along the circumferential direction of the first shaft body through the cockpit, such that the first power device and the second power device can provide power for the airship to move in this direction.

Figure 11:
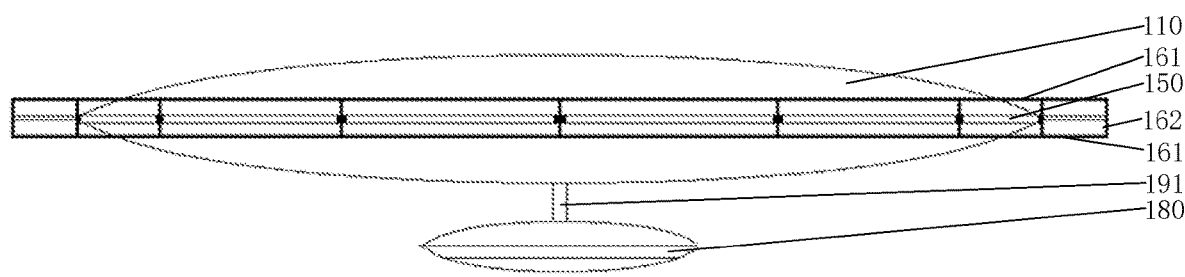
FIG. 11 is a view illustrating a structure of the gasbag, the second rigid ring, the ring fin, the connecting portions, a hollow rod and a function cabin according to an embodiment of the present application.

Further, referring to FIGS. 1 and 11, the airship further includes a function cabin 180. The gasbag 110 and the function cabin 180 are fixed on the first shaft body 130 and are rotatable along the circumferential direction of the first shaft body 130. When the airship needs to turn, only the cockpit 120 is rotated, which prevents the operating angle of the operator in the cockpit 120 from being restricted. It is not necessary to rotate the gasbag 110 and the function cabin 180 at the same time when the cockpit 120 is rotated, thereby improving the controllability, maneuverability and stability of the airship during operation.

In this embodiment, the function cabin 180 is located between the gasbag 110 and the cockpit 120, and there is a spacing between the function cabin 180 and the gasbag 110 as well as the cockpit 120. The second power device 173 is located between the function cabin 180 and the cockpit 120, and there is a spacing between the second power device 173 and the function cabin 180 as well as the cockpit 120.

Further, in this embodiment, the function cabin 180 is a closed type. It should be noted that in other modifiable embodiments, the function cabin may also be a semi-enclosed, unroofed, convertible or double-deck type.

Specifically, referring to FIGS. 1, 9, 10 and 11, the airship further includes a hollow rod 191 and a baffle 192. The gasbag 110 and the function cabin 180 are fixed on the hollow rod 191, and the hollow rod 191 is rotatably sleeved on the first shaft body 130. Therefore, the gasbag 110 and the function cabin 180 are rotatably fixed on the first shaft body 130. The baffle 192 is fixed to the first shaft body 130, and the baffle 192 is provided at an end of the hollow rod 191 away from the cockpit 120. Thus, the hollow rod 191 is prevented from moving along the axial direction of the first shaft body 130 and away from the cockpit 120.

In addition, there is a spacing between the function cabin 180 and the gasbag 110 as well as the cockpit 120. When the airship encounters a crosswind during flight, the crosswind can blow across the surface of the bottom portion 113 through the spacing between the gasbag 110 and the function cabin 180. The distance traveled by the crosswind to blow across the top portion 111 is still the same as that traveled by the crosswind to blow across the bottom portion 113.

Figure 12:
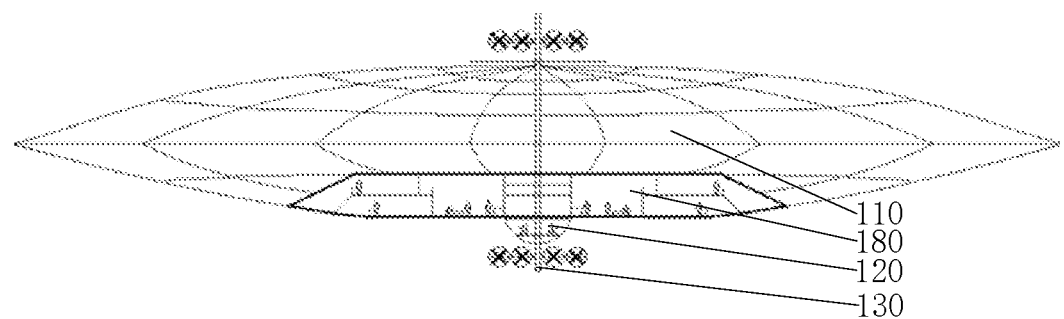
FIG. 12 is a view illustrating a structure of the function cabin and the cockpit of the airship in a first example according to an embodiment of the present application.
Figure 13:
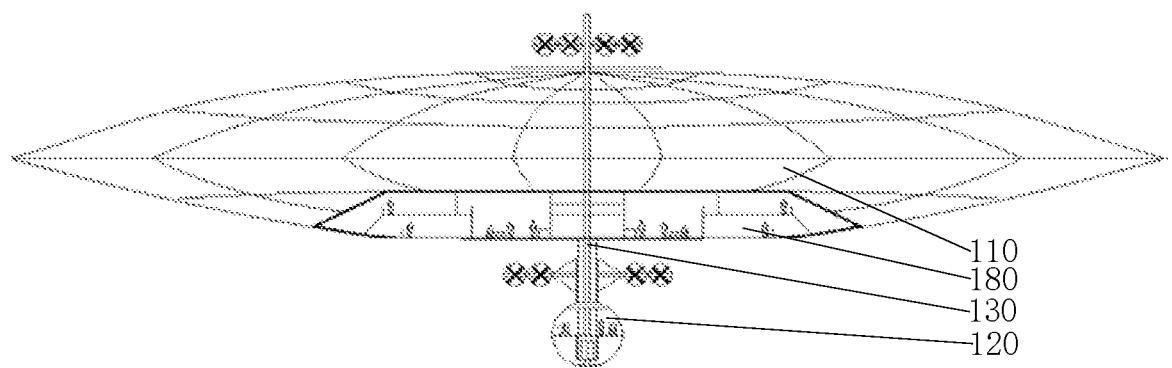
FIG. 13 is a view illustrating a structure of the function cabin and the cockpit of the airship in a second example according to an embodiment of the present application.
Figure 14:
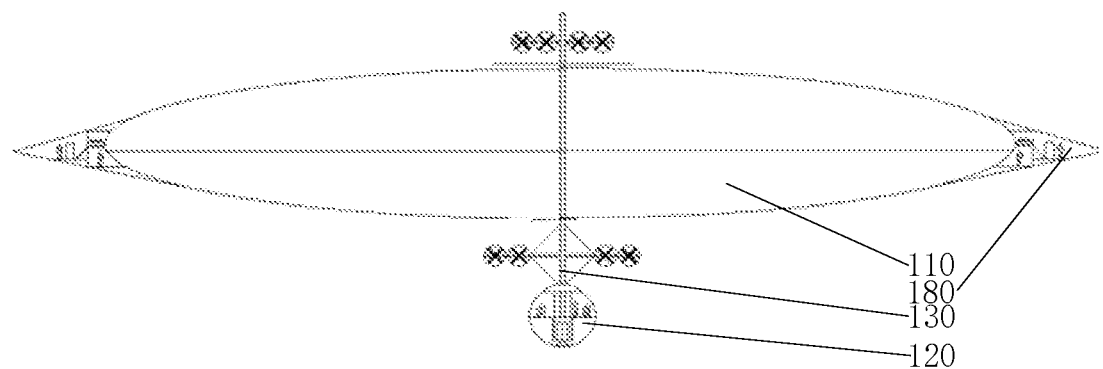
FIG. 14 is a view illustrating a structure of the function cabin and the cockpit of the airship in a third example according to an embodiment of the present application.

It should be noted that in other modifiable embodiments, the cockpit and the function cabin may also be arranged in other positions and used to carry passengers or store items. In a first example, referring to FIG. 12, the function cabin 180 is located in the gasbag 110 and at the bottom of the gasbag 110, and the cockpit 120 is connected to the bottom of the function cabin 180. In a second example, referring to FIG. 13, the function cabin 180 is located in the gasbag 110 and at the bottom of the gasbag 110, and the cockpit 120 is located at the bottom of the function cabin 180 and is spaced apart from the function cabin 180. In a third example, referring to FIG. 14, the function cabin 180 surrounds the gasbag 110 and is fixed to the gasbag 110, and the cockpit 120 is located at the bottom of the gasbag 110 and is spaced apart from the gasbag 110.

Further, referring to FIG. 1, the function cabin 180 includes an upper portion 181 and a lower portion 182 that is provided opposite to the upper portion 181 and connected to the upper portion 181. The upper portion 181 and the lower portion 182 are sequentially arranged along the axial direction of the first shaft body 130, and a surface area of the upper portion 181 is 1-1.3 times that of the lower portion 182.

In this embodiment, the surface area of the upper portion 181 is the same as that of the lower portion 182. When the airship encounters a crosswind during flight, a distance traveled by the crosswind to blow across the upper portion 181 is the same as that traveled by the crosswind to blow across the lower portion 182. Therefore, a flow velocity of the crosswind to blow across the upper portion 181 is the same as that of the crosswind to blow across the lower portion 182, such that air pressure on an outer surface of the upper portion 181 is the same as that on an outer surface of the lower portion 182. In this way, the stability of the airship during operation is further improved.

It should be noted that, in other modifiable embodiments, the surface area of the upper portion may also be greater than that of the lower portion and not more than 1.3 times that of the lower portion. When the airship encounters a crosswind during flight, the distance traveled by the crosswind to blow across the upper portion is slightly greater than that traveled by the crosswind to blow across the lower portion. Therefore, the flow velocity of the crosswind to blow across the upper portion is slightly greater than that of the crosswind to blow across the lower portion, such that the air pressure on the outer surface of the upper portion is slightly less than that on the outer surface of the lower portion, thereby providing power for the airship to ascend. In an example, the surface area of the upper portion is 1.3 times that of the lower portion. In another example, the surface area of the upper portion is 1.1 times that of the lower portion.

Figure 15:
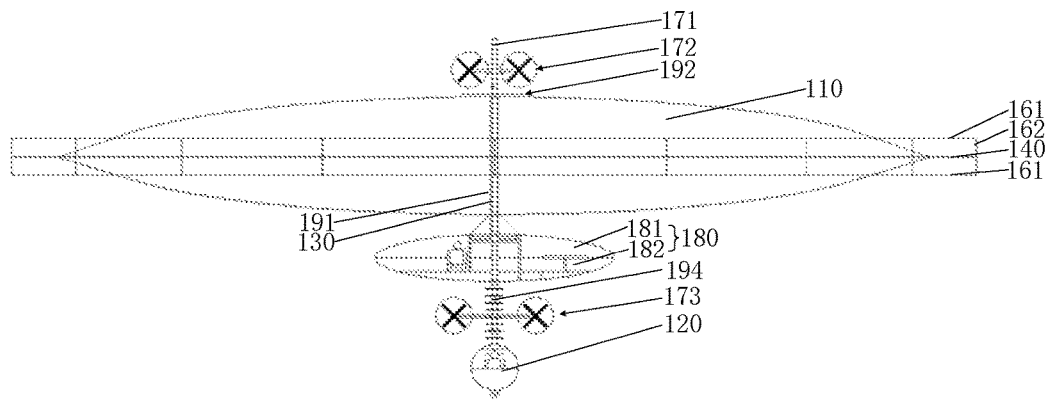
FIG. 15 is a view illustrating a structure of the airship in an example according to an embodiment of the present application.

In addition, referring to FIG. 1, in order to facilitate passengers to take the airship, in this embodiment, the airship is further provided with a staircase 193 extending from the cockpit 120 to the function cabin 180. In a first example, referring to FIG. 15, the airship is provided with a vertical ladder 194 extending from the cockpit 120 to the function cabin 180. In a second example, the function cabin is provided with a folding ladder. When the airship is parked on the ground, the folding ladder can be extended from the function cabin to the ground to facilitate passengers boarding the airship. In a third example, the airship is provided with an elevator extending from the cockpit to the function cabin.

Figure 16:
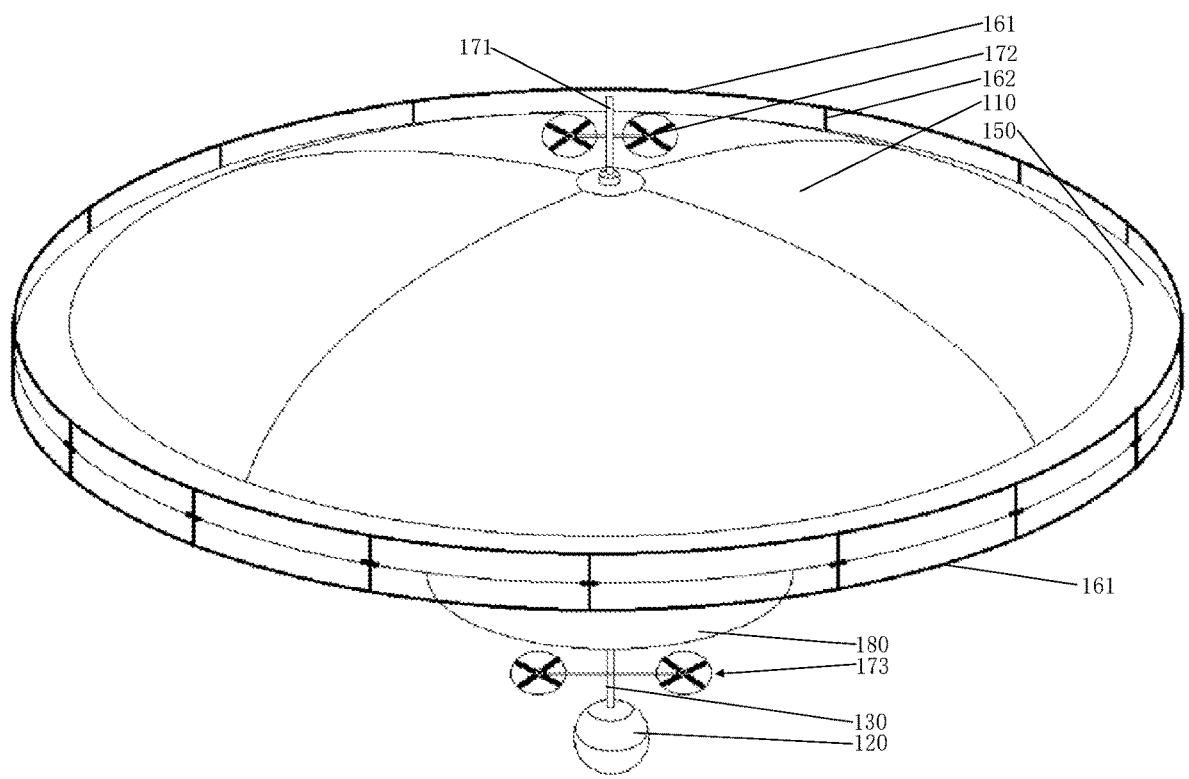
FIG. 16 is a view illustrating a structure of the airship (with a staircase not shown) according to an embodiment of the present application.
Figure 17:
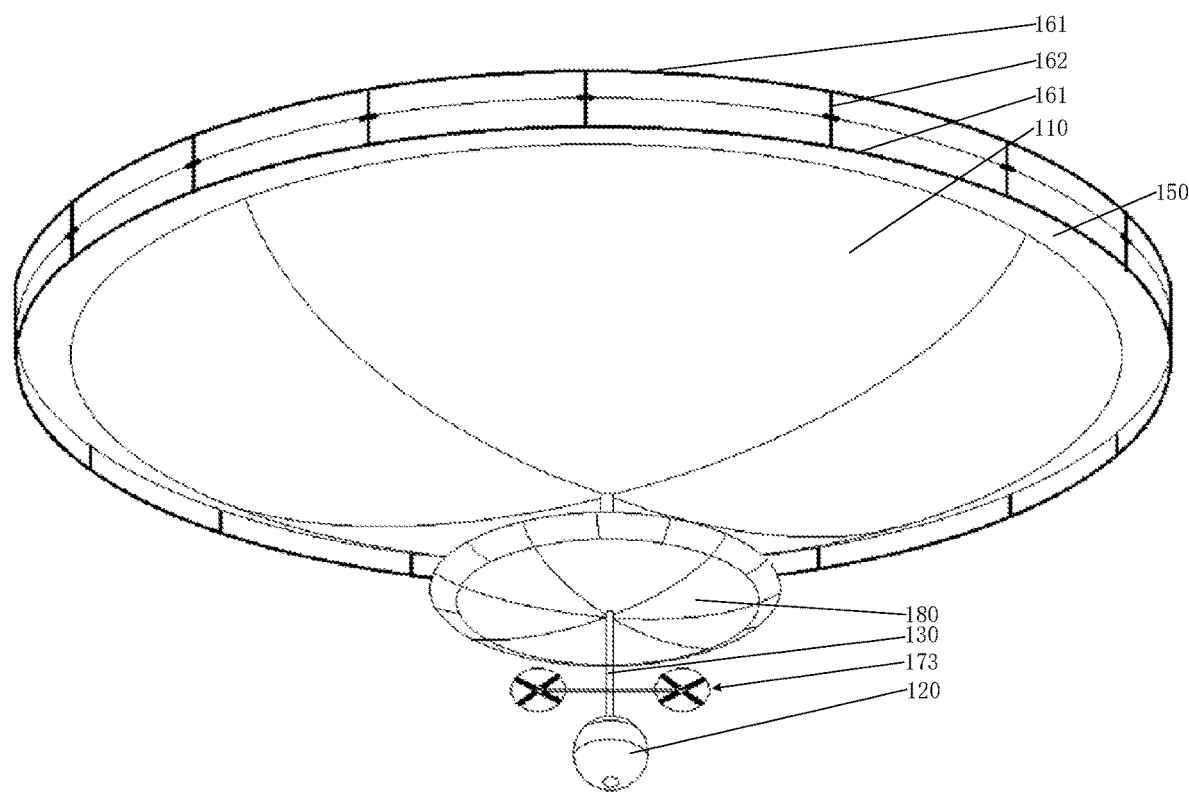
FIG. 17 is a view illustrating a structure of the airship (with a staircase not shown) from another perspective according to an embodiment of the present application.

Preferably, referring to FIGS. 16 and 17, the maximum dimension of the cockpit 120 in a direction perpendicular to the axial direction of the first shaft body 130 is less than that of the function cabin 180 in the direction perpendicular to the axial direction of the first shaft body 130. The maximum dimension of the function cabin 180 in the direction perpendicular to the axial direction of the first shaft body 130 is less than that of the gasbag 110 in the direction perpendicular to the axial direction of the first shaft body 130. When the airship needs to land on the ground from the air, since the maximum dimension of the cockpit 120 in the direction perpendicular to the axial direction of the first shaft body 130 is small, an area required for the airship to land is reduced. When a concave parking spot is provided on the ground where the airship needs to land and the dimensions of the concave parking spot are more than those of the cockpit 120, the cockpit 120 and even the function cabin 180 can be lowered into the concave parking spot. In this case, the gasbag 110 can be located outside the concave parking spot to achieve a safe parking state. The concave parking spot may be a facility that can accommodate the cockpit 120, such as a pit or a circular building with a groove inside.

Figure 18:
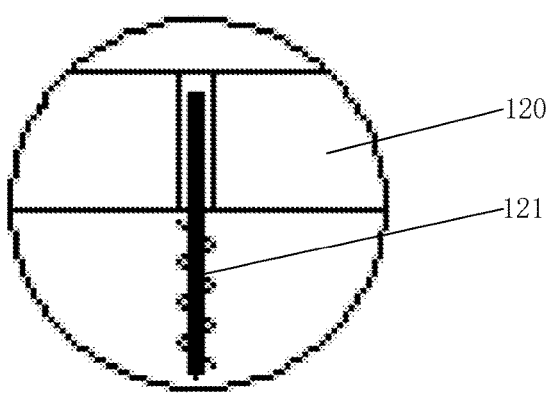
FIG. 18 is a view illustrating a structure of the cockpit and an anchoring device according to an embodiment of the present application.
Figure 19:
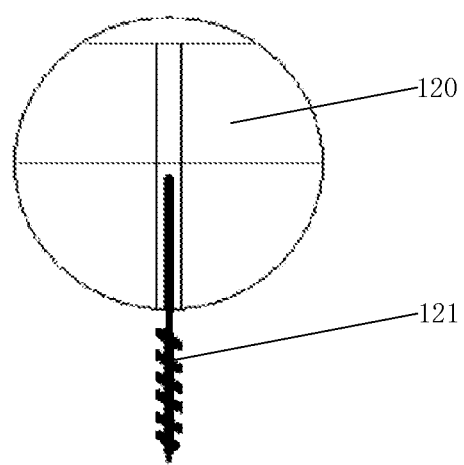
FIG. 19 is a view illustrating a structure of the cockpit and the anchoring device in another state according to an embodiment of the present application.

Further, referring to FIGS. 1, 18 and 19, the airship provided in this embodiment further includes an anchoring device 121 located in the cockpit 120 and capable of extending from the cockpit 120 along the axial direction of the first shaft body 130 and away from the gasbag 110. When the airship lands on the ground, the anchoring device 121 can extend from the cockpit 120 along the axial direction of the first shaft body 130 and away from the gasbag 110, and be embedded in the ground, so as to stabilize the airship. In this embodiment, the anchoring device 121 is a spiral drill type. It should be noted that, in order to adapt to different landing sites, in other modifiable embodiments, the anchoring device may also be a ring buckle type or a long pole type.

Those of ordinary skill in the art should understand that the above implementations are specific embodiments for implementing the present application. In practical applications, various changes may be made to the above implementations in terms of form and details without departing from the spirit and scope of the present application. Those skilled in the art may make changes and modifications to the implementations without departing from the spirit and scope of the present application. Therefore, the protection scope of the present application should be subject to the scope defined by the claims.

What is claimed is:

1. An airship, comprising a gasbag, a cockpit and a first shaft body, wherein
the gasbag is filled with a gas for lifting the airship; the gasbag and the cockpit are sequentially arranged along an axial direction of the first shaft body and fixed to the first shaft body, and a spacing is provided between the gasbag and the cockpit; at least one of the gasbag and the cockpit is rotatably connected to the first shaft body; after the gasbag is filled with the gas for lifting the airship, a section of the gasbag in a direction perpendicular to the axial direction of the first shaft body is circular or annular; and the axial direction of the first shaft body is the same as a direction of gravity;
the airship further comprising a second shaft body, a first power device and a second power device, wherein
the second shaft body is coaxially provided with the first shaft body; the second shaft body and the first power device are located on a side of the gasbag away from the cockpit; the first power device is fixed to the second shaft body; the second power device is located between the gasbag and the cockpit and is fixed to the first shaft body; the first power device and the second power device are configured to drive the airship to move in the direction perpendicular to the axial direction of the first shaft body; and alternatively, the first power device and the second power device are configured to drive the airship to move along the axial direction of the first shaft body; and
the cockpit is configured to control the first power device and the second power device to rotate along a circumferential direction of the first shaft body.

2. The airship according to claim 1, further comprising a fixing portion, wherein
the fixing portion is configured for pulling the gasbag, supporting the gasbag, or restricting the gasbag from expanding in the direction of gravity after the gasbag is filled with the gas for lifting the airship, wherein a first maximum dimension of the gasbag in the direction perpendicular to the direction of gravity is greater than a second maximum dimension of the gasbag in the direction of gravity.

3. The airship according to claim 2, wherein
after the gasbag is filled with the gas for lifting the airship, the first maximum dimension of the gasbag in the direction perpendicular to the direction of gravity is defined as a first dimension, and the second maximum dimension of the gasbag in the direction of gravity is defined as a second dimension; and the first dimension is 3-9 times the second dimension.

4. The airship according to claim 2, wherein the fixing portion is a first rigid ring; an inner ring surface or an outer ring surface of the first rigid ring is fixed to the gasbag; and the first rigid ring pulls or supports the gasbag after the gasbag is filled with the gas for lifting the airship, wherein the first maximum dimension of the gasbag in the direction perpendicular to the direction of gravity is greater than the second maximum dimension of the gasbag in the direction of gravity.

5. The airship according to claim 4, further comprising a ring fin surrounding the gasbag; wherein
the first rigid ring is fixed to the ring fin and the ring fin is fixed to the gasbag.

6. The airship according to claim 4, further comprising two second rigid rings and a plurality of first connecting portions, wherein
the two second rigid rings are arranged coaxially with the first rigid ring, and the two second rigid rings are sequentially arranged along an axial direction of the first rigid ring; the first rigid ring is located between the two second rigid rings; and the plurality of first connecting portions are distributed along a circumferential direction of the first rigid ring, and each of the plurality of first connecting portions is connected to the first rigid ring and the two second rigid rings.

7. The airship according to claim 4, wherein
the gasbag comprises a top portion, a second connecting portion and a bottom portion that are sequentially arranged along the axial direction of the first shaft body; the top portion and the bottom portion are arranged opposite to each other; the second connecting portion is connected to the top portion and the bottom portion; the top portion, the second connecting portion and the bottom portion jointly enclose the gasbag; the first rigid ring is fixed to the second connecting portion; a maximum dimension of the second connecting portion in the direction perpendicular to an axial direction of the first rigid ring is greater than a maximum dimension of the top portion or the bottom portion in the direction perpendicular to the axial direction of the first rigid ring; and a surface area of the top portion is 1-1.3 times a surface area of the bottom portion.

8. The airship according to claim 1, wherein the first power device and the second power device respectively comprise a third shaft body, blades and rotating portions; the blades are respectively rotatably connected to one end of the third shaft body through the rotating portions; and the third shaft body of the first power device is fixed to the second shaft body, and the third shaft body of the second power device is fixed to the first shaft body.

9. The airship according to claim 1, wherein the first power device and the second shaft body are rigidly connected; the second power device and the cockpit are rigidly connected to the first shaft body; and the gasbag is connected to the first shaft body and is rotatable along the circumferential direction of the first shaft body.

10. The airship according to claim 1, further comprising a function cabin, wherein the gasbag and the function cabin are connected to the first shaft body and are rotatable along the circumferential direction of the first shaft body; and the cockpit is rigidly connected to the first shaft body.

11. The airship according to claim 10, wherein the function cabin is located between the gasbag and the cockpit, and a spacing is provided between the function cabin and the gasbag, and between the function cabin and the cockpit.

12. The airship according to claim 11, wherein the function cabin comprises an upper portion and a lower portion that is provided opposite to the upper portion and connected to the upper portion; and the upper portion and the lower portion are sequentially arranged along the axial direction of the first shaft body, and a surface area of the upper portion is 1-1.3 times a surface area of the lower portion.

\* \* \* \* \*